United States Patent Office 3,240,315
Patented Mar. 15, 1966

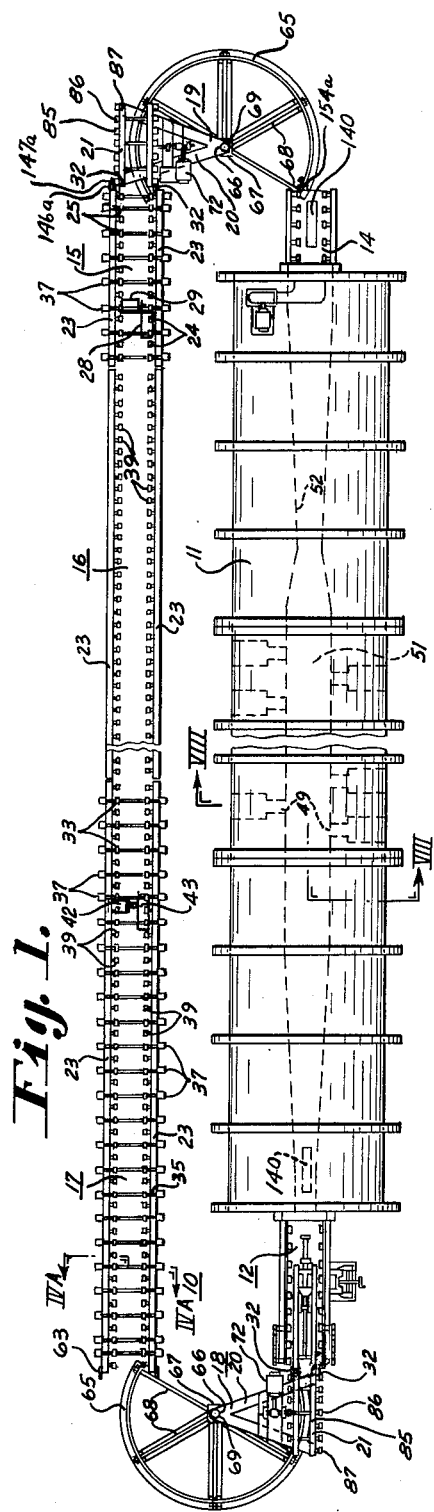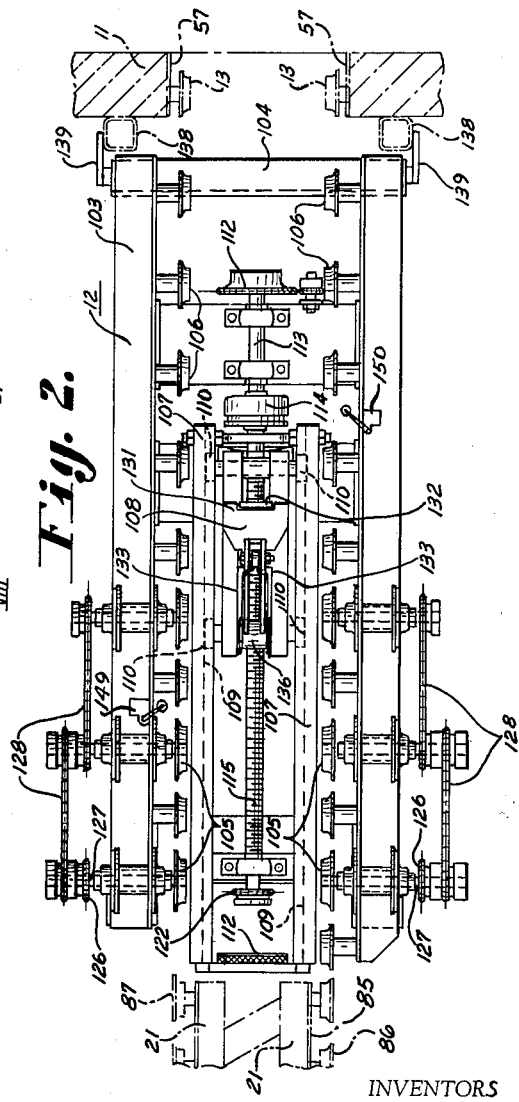

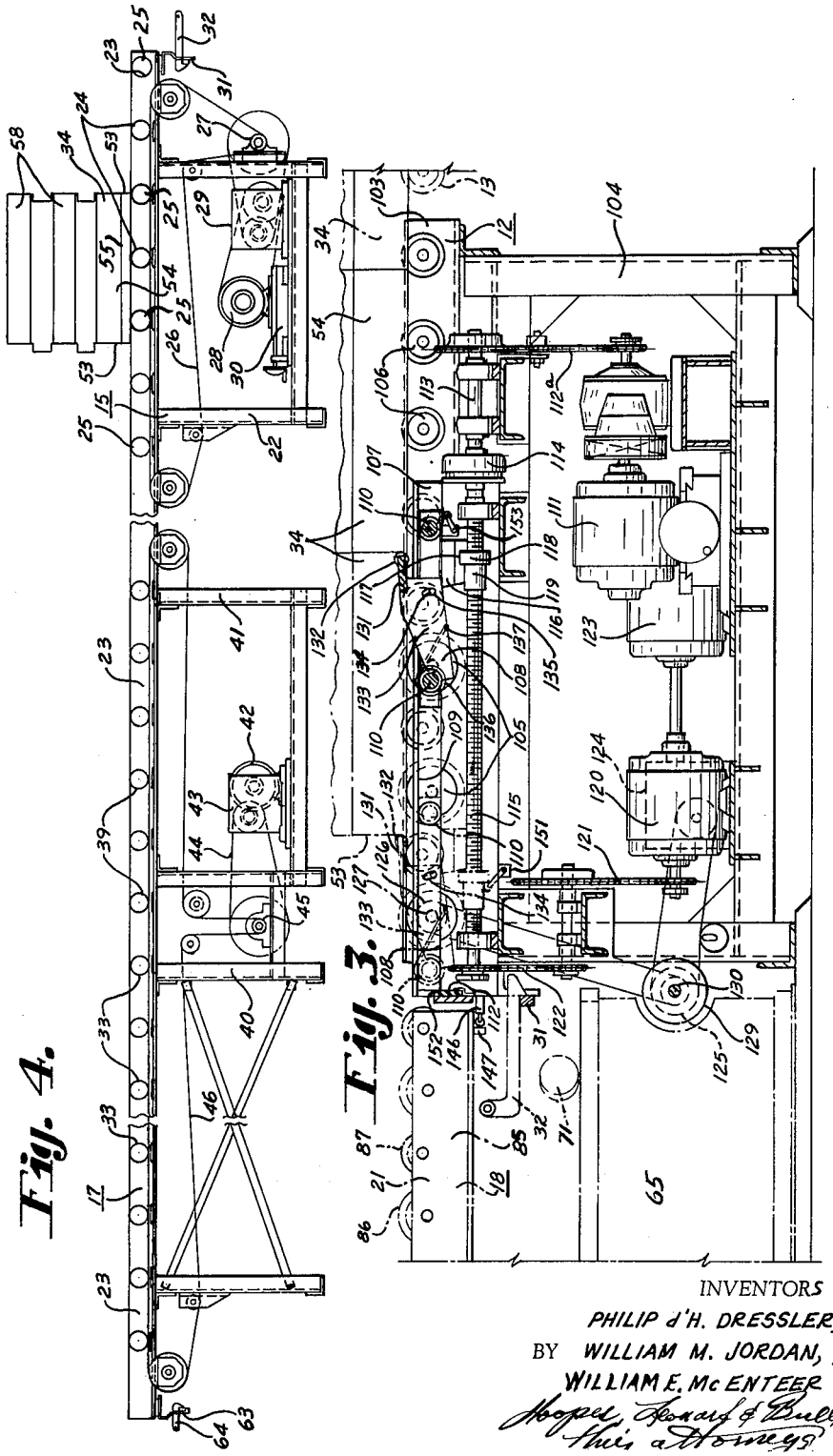

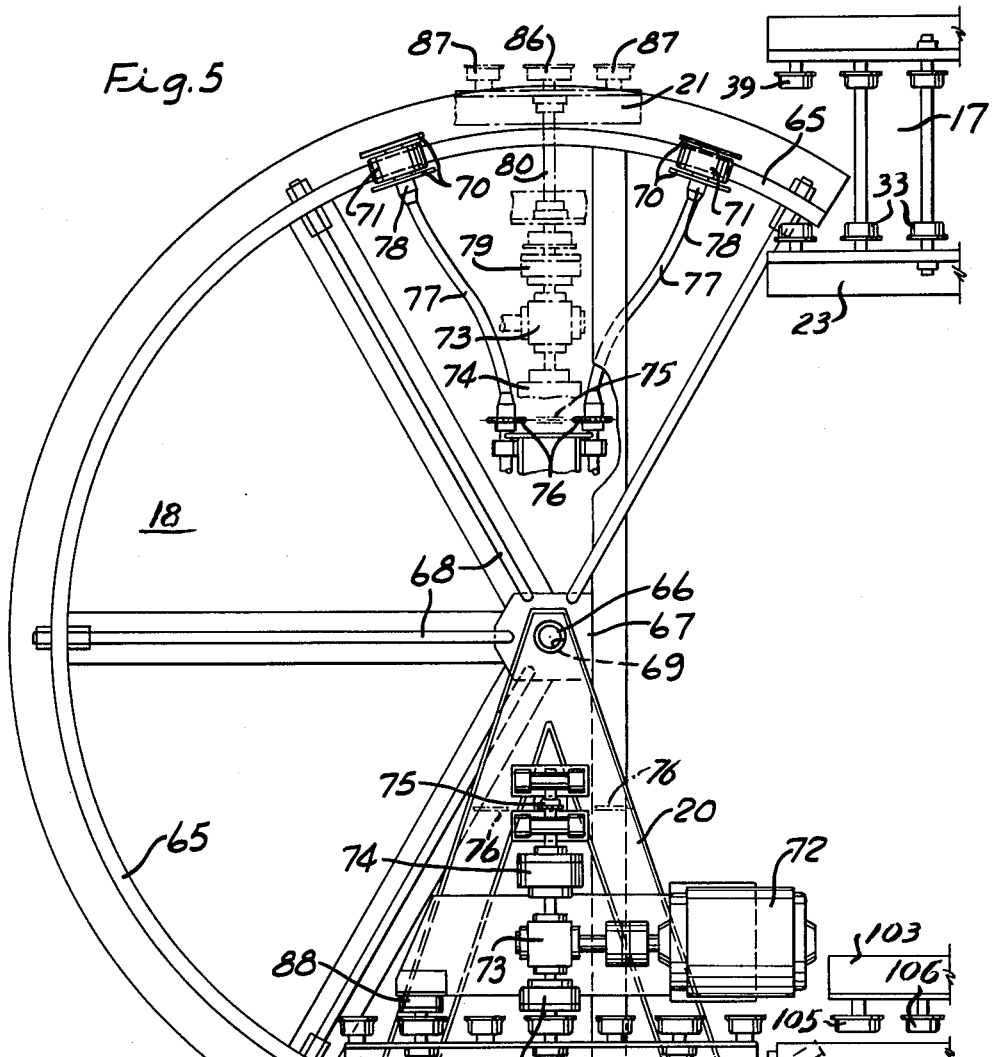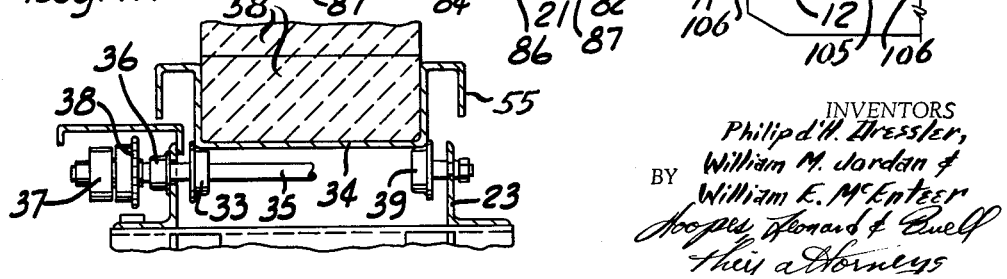

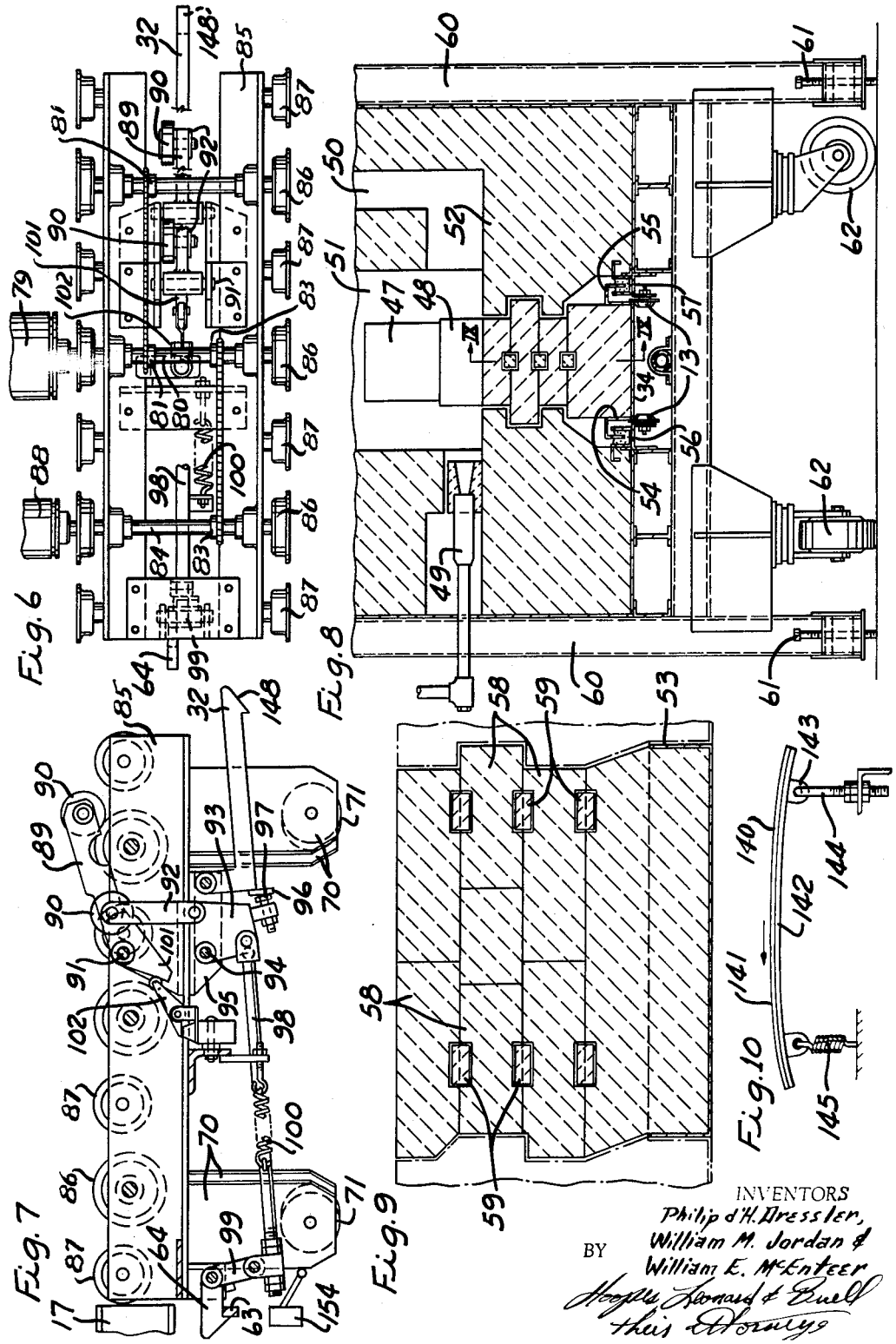

3,240,315
ROLLER CONVEYOR SYSTEM
Philip d'H. Dressler, Pittsburgh, William M. Jordan, Fox Chapel Borough, Allegheny County, and William E. McEnteer, Aspinwall Borough, Allegheny County, Pa., assignors, by mesne assignments, to Pullman Incorporated, Pittsburgh, Pa., a corporation of Delaware
Filed Oct. 2, 1963, Ser. No. 313,229
8 Claims. (Cl. 198—85)

This invention relates to a roller conveyor system along which supporting pallets or pans, or materials, are movable for handling, processing, or other purpose. More particularly, this invention pertains to a closed circuit conveyor system having straight reaches and transfer means for effecting transfer of such pallets, pans, or other materials, between the respective ends of reaches, for use, for example, in connection with tunnel kilns, other processing equipment, or production lines. Such conveyor systems may be made to operate automatically and are particularly advantageous when utilized in the conveyance of wares to be heated to high temperature in kilns or furnaces in cooperation with which such conveyor systems may be used.

Roller conveyor systems made in accordance with this invention have many significant advantages. Therein, the flow of pallets, pans or other material along the conveyor bed can be controlled at will, that is, it can be continuous end-to-end along one portion of the conveyor bed and at will interruptions and gaps provided along other portions of the conveyor bed. When operated in cooperation with high temperature kilns and furnaces, such systems may eliminate use of transverse metal spans relatively more subject to thermal deterioration, and, afford more accessible surfaces for cooling arrangements. Speeds along the conveyor bed can be regulated as desired and may be varied from place to place therealong. In closed circuit embodiments, transfer means are provided which precisely register with the ends of the reaches between which the transfers are to be effective and operate automatically and evenly. Such flexibility, precision and evenness of operation are particularly important, illustratively, in the handling of ceramic wares and other relatively fragile materials which are to be baked or otherwise treated along some portion of the length of a conveyor system of this invention with off-loading and on-loading occurring along another portion, or portions of the system, usually outside of any heating equipment that may be employed. In embodiments of this invention, means to prevent underrunning or overrunning of equipment or material therealong may be provided. And, the new construction is relatively rugged, serviceable, compact and capable of utilizing many standard items in the construction and operation thereof.

Other objects, features and advantages of this invention will be apparent from the following description and the accompanying drawings, which are illustrative of one embodiment only, in which FIGURE 1 is a plan view of one embodiment of a close circuit conveyor system of this invention in combinative relation to a high temperature tunnel kiln, such conveyor system having two long parallel reaches with registering arcuate transfers at the respective ends of those reaches;

FIGURE 2 is a plan view, somewhat enlarged, of the entry end of the processing reach of such conveyor system embodiment principally comprising pusher means incorporated therein;

FIGURE 3 is a view in side elevation of the apparatus shown in FIGURE 2;

FIGURE 4 is a view, somewhat enlarged, of the return and feed table portions of the return reach of the conveyor system embodiment illustrated in FIGURE 1;

FIGURE 4A is a detail view in cross section taken along line IVA—IVA of FIGURE 1 to show overrunning drive roller and idler roller types which may be used in such system;

FIGURE 5 is a plan view somewhat enlarged of a novel arcuate transfer mechanism in such conveyor system embodiment, illustrated in use at one end of the closed circuit;

FIGURE 6 is a plan view, somewhat enlarged, of the transfer table in the transfer mechanism shown in FIGURE 5;

FIGURE 7 is a view in side elevation of such transfer table;

FIGURE 8 is a partial view, somewhat enlarged, of the lower portion of the cooperating kiln including the conveyor system portion therein taken along line VIII—VIII of FIGURE 1;

FIGURE 9 is a view in cross section, somewhat enlarged, taken along line IX—IX of FIGURE 8 to show the pallet pan and refractory support used to support ware as it proceeds along the conveyor system embodiment of this invention; and FIGURE 10 is a detail view in side elevation of one form of snubber which may be utilzed in the illustrated conveyor system.

Referring to the drawings, a closed circuit conveyor system 10 illustrated therein is in combinative cooperating relation to a high temperature tunnel kiln 11. Such a kiln is described and claimed in an application for United States Letters Patent Serial No. 295,335 filed July 16, 1963. Conveyor system 10 includes a processing reach comprising a pusher table 12, a kiln portion 13 within kiln 11 and an exit table 14 in registry with one another. Conveyor system 10 also has a parallel return reach comprising a return table 15, an idler table 16 and a feed table 17 in longitudinal registry with one another. The different portions of each reach are provided with different means for convenience of description and reach may be a unitary piece of equipment if desired. Conveyor system 10 also includes two transfers, transfer 18 being at the entry end and transfer 19 being at the delivery end of the illustrated embodiment. Each transfer is provided with a sector carrier 20 supporting a transfer table 21 on its outer end. The conveyor bed of a system 10 in the illustrated embodiment is about waist height for convenience and substantially is a closed oval loop as appears in FIGURE 1, comprising the two parallel reaches and the arcuately movable transfer tables at the respective ends of that loop in the illustrated system 10.

In the return reach, return table 15 comprises a stand 22 having angle side rails 23 which, in effect, are continued from one end of the return reach to the other. On the rails 23 are mounted idler rollers 24 preferably alternated with driving rollers 25 so that a pan 34 on table 15 is always in contact with at least one pair of driving rollers 25 to move that pan or any train thereof toward the other end of the return reach. Such rollers 25 have sprockets which engage an endless chain 26 driven at a selected speed by a drive pinion 27 constantly turned by a motor 28 in conjunction with a speed reducer 29, the motor having a belt tightening adjustment subassembly 30 for use when needed. The end of return table 15 toward delivery transfer 19 is provided with a latch bar 31 suspended therebelow in rigidly fixed relation to operatively engage at appropriate times a latch 32 on transfer table 21 belonging to the delivery end transfer 19. Driving rollers 25 are of the overrunning type as shown in more detail in FIGURE 4A. Therein a driven roller 33 is flanged to guide a pallet in the form of a kiln pan 34 used in the illustrated embodiment. Roller 33 is fastened to a shaft 35 which extends through a bearing 36 into a clutch 37 of the overrunning type. Thereby, as chain 46 is moved, it will drive a sprocket 38, free on shaft 35, to drive roller 33 through clutch 37 at a selected speed. However, if pan 34 comes off idler table 16 (or transfer table 21 of delivery transfer 19 in the case of table 15) at a faster speed, the drive wheels 33 will overrun because of clutch 37 without changing the speed of sprocket 38; however, if pan 34 comes off slower than the sprocket speed of drive rollers 33, the drive rollers will act to increase the speed of such pan 34 and move it together with any abutting pans ahead of it. Idler rollers 24, like each idler roller 39, is not driven and is free to rotate, it being mounted for rotation in the side rails 23 and also are provided with flanges to define the conveyor bed along the pans 34 are guidably moved between such flanges on top of the treads of the rollers. Rollers, whether idler or driven, are mounted opposite one another in the illustrated embodiment but may, if desired, be offset along the course of the conveyor bed of system 10. Further, in the return reach, while idler rollers normally are mounted on stub shafts extending to the nearer side rail, opposed pairs of idler rollers at spaced intervals along such return reach may have a transverse shaft to further tie the upper sides of the return reach together where it may be desired and there is no need for a clear center in that portion of the reach. As shown, the height of the bed positions the bottom of pan 34 and in the illustrated embodiment, that bed is in a horizontal plane, although a conveyor system of this invention may be made with portions thereof ramped or inclined.

Idler table 16 shown in FIGURE 1, is positioned in registry with tables 15 and 17 and mechanically connected thereto. It is provided with a stand similar to stand 22 but has no motor apparatus connected therewith because all of the rollers rotatably mounted on the side rails 23 are idler rollers 39 similar to rollers 24 and the idler rollers 39 on the feed table. Idler table 16 is one on which an attendant standing or walking on the outer side thereof can offload finish wares from pans delivered by return table 15, onload fresh wares to pass through kiln 11 on pans 34 which have previously been offloaded, inspect pans and the refractory supports thereon, remove a pan in which the refractory support thereon for wares may need some attention or replacement or perform any other service desired. Movement along idler table 16 is substantially under the control of and can be selected with considerable variation by the attendant inasmuch as the return reach of system 10 preferably is not and does not have to be filled with the pans in end-to-end relation as they are when passing through kiln 11 between pusher table 12 and exit table 14. Onloading of fresh ware may also be performed at feed table 17.

As shown in FIGURE 4, feed table 17 is supported on stands 40 and 41 connected together for the aforesaid registry in the return reach with the side rails 23 thereof continuous with the side rails of tables 16 and 15. A motor 42 through a speed reducer 43 at selected speed drives a belt drive 44 to rotate a pinion 45 and drive a sprocket chain 46 extending along the inner side of said table 17 to drive opposed longitudinally spaced rollers 33 on the feed table which are provided with sprockets and overrunning clutches 37 functioning in the manner described above along the length of the feed table to the delivery end where pans 34 with fresh wares thereon are individually moved onto the transfer table 21 of the entry transfer 18 at the appropriate times.

As shown more fully in FIGURES 8 and 9, each pan 34 has a horizontal bottom which moves along the pass plane of the conveyor bed and acts as a pallet for the ware 47 which may be in a ceramic container if small items. Usually such wares for high temperature kiln 11 may rest directly on a supplemental base 48 having transverse openings therethrough for circulation of gases such as those discharged by heating burners 49, flues 50 being provided at appropriate points along the ware space 51 within the refractory walls 52 defining the tunnel of kiln 11. Each pan 34 is provided with upstanding planar ends 53 and sides 54. The sides are provided with longitudinal extending inverted U-shaped flanges 55. The lower outer ends of the flanges 55 in kiln 11 pass through troughs 56 having sand therein to provide sealing for the metal substructure of the kiln including protection for the conveyor bed portion 13 therein having like-numbered flanged idler rollers. Rollers 13 are like idler rollers 39 and are rotatably mounted on the inner flange of the channels 57 rigidly connected to the substructure of the kiln 11 in the illustrated embodiment to serve as a portion of the processing reach of system 10. Instead of being fastened to the substructure of kiln 11, the conveyor portion cooperating therewith, or any other equipment, may be made separately with a separate stand if desired and suitably, either removably or otherwise, secured to the kiln or other structure with which it is to serve.

Lateral sealing is also obtained by the relative interfitting of the refractory shapes 58 with the kiln passageway sides above conveyor portion 13. Such shapes with pan 34 are a part of the support for wares 47 and any supplemental base 48 that may be used. Such refractory shapes 58 at least in the upper courses thereof preferably are keyed by refractory key blocks 59 for ease of replacement of one or more of said shapes, if required. Sealing at the ends of each pan 34 with its support 58 as it moves through kiln 11 is obtained by flush abutment of the respective ends 53 of the respective succeeding pans 34 and, further, by the interfitting offsets fore and aft of each support 58 carried by a pan 34, to minimize heat loss, flow of the gases and protect metal parts of the kiln 11 and conveyor system 10. Operation of a kiln such as kiln 11 is more fully described and is claimed in the aforesaid patent application Serial No. 295,335.

In kiln 11, the vertical structural frame members 60 are provided with stand screws 61 on which the kiln is supported during use; such stand screws 61 being threaded through the feet of the members 60 to be used to serve as a stand and for leveling purposes. Normally in use, kiln 11 is raised sufficiently high by screws 61 to take any load off swiveling casters 62 mounted on the underside of the kiln frame and used when screws 61 are retracted for a purpose such as rolling the kiln sections into place when the kiln is made sectional, or is small enough to be so handled without being in sections.

Feed table 17 at its delivery end is provided with a latch bar 63 which is suspended from and rigidly fixed to that end of table 17 to coact at the appropriate times with a movable latch 64 on the receiving end of table 21 of entry transfer 18. Entry transfer 18 is identical to delivery transfer 19 which completes the loop circuit at the delivery end so that the description of the one herein will apply to the construction and operation of both at their respectively appropriate and relatively independent times of operation. Each such transfer has an elevated arcuate rail track 65 comprising the major portion of a circle between the adjacent reach ends. A fixed hollow center post 66 is provided with a flange 67 linked to stay bolts 68 extending to the outer side of rail 65 below the top horizontal track surface thereof for a sector carrier 20. Carrier 20 is triangular in plan and provided with a downwardly extending pivot pin 69 to fit in the hollow of center 66 for the pivotal movement of carrier 20 in opposite directions. The underside of the radial beams of carrier 20 are provided with downwardly extending tangentially positioned radially spaced brackets 70 between each of which a wheel 71 is journaled. Hence each carrier 20 can swing in a full semicircular arc from a position normal to the direction of one reach to a position diametrally opposite and perpendicular to the line of direction of the other parallel reach of the conveyor system 10 as indicated in FIGURE 5 by the solid and chain line positions of the carrier 20 therein shown. Carrier 20 is moved at the appropriate times from one such extreme position to the other by a reversible electric motor 72 mounted on top of the radial beams of carrier 20 inboard of transfer table 21. The shaft of motor 72 is operative through a reducer 73 and a magnetic clutch 74 to rotate a drive sprocket pinion 75 at appropriate times and in the appropriate direction. When pinion 75 is rotated it is connected by a flexible chain to two driving sprockets 76 each of which is connected by a flexible shaft 77 to an axial stub 78 extending inwardly of the radially inner bracket 70 and bushing of one of the wheels 71. In either extreme position of transfer 18, or 19, its transfer table 21 is in registry with the corresponding end of one or the other of the parallel conveyor reaches of system 10.

The other output shaft of reducer 73 is connected through a further magnetic clutch 79 to drive, at appropriate times, a shaft 80 which by means of one set of sprockets 81 correspondingly rotates shaft 82 and by means of another set of sprockets 83 correspondingly rotates shaft 84, the shafts being journaled in side angles 85 comprising the mounts for the respective bushings of shafts 80, 82 and 84. Hence when clutch 79 is engaged, the rotation of motor 72 in the proper direction will rotate the flanged driven rollers 86 mounted outboard of the angles 85 at the outer ends of such shafts. The flanges of the driven rollers 86 and of idler rollers 87 also rotatably mounted on adjacent angles 85, comprise a continuance of the conveyor bed at the respective ends of the parallel reaches served by them, as shown in FIGURES 1 and 5. Angles 85 are fixed to the radial beams of carrier 20 and an electrically operated brake 88 is fixed to one of said beams to cooperate with the nearest driven roller 86 so that, normally, when clutch 79 is disengaged, brake 88 engages such nearest driven roller 86 to hold any pallet or pan on table 21 during movement thereof between ends of the parallel reaches of conveyor system 10. And, as seen in FIGURE 7, there is a common horizontal tangent at the top of the treads of the respective rollers 86 and 87 which coincides with the horizontal plane of the conveyor bed of the balance of the conveyor so that a pan 34 may be moved endwise onto and off of a table 21 smoothly and without change in elevation.

A depressable arm 89, provided with transverse rollers 90 at the ends of the top thereof, is fixed to pivot between the sides of each table 21 about a cross pin 91. A depending link 92 is pivoted at its lower end to a vertical swing plate 93 which swings about an axis 94 fixed to a bracket 95 secured to table 21 immediately below the level of angles 85. Bracket 95 also has latch 32 pivotally connected thereto. Latch 32 has a heel plate 96 adapted to be engaged by an adjustable finger 97 fastened to the bottom of plate 93. A rod 98 is pivotally connected to plate 93 and extends to a bell arm 99 which moves latch 64 when arm is swung about its pivot by rod 98. Rod 98 is biased by spring 100 toward lowered position for latch 64 and raised position for arm 89 and latch 32. Conversely, when arm 89 is depressed by the presence thereon of a pan 34 latch 64 is moved to raised position and latch 32 to its lowered one. A depending end 101 of arm 89 operates a limit switch 102 fixed to the underside of the table 21 when arm 89 is depressed.

Pusher table 12 is shown in detail in FIGURES 2 and 3. Therein, angle side rails 103 are mounted on a stand 104. The side rails are provided with opposed driven flanged rollers 105 and opposed flanged idler rollers 106 defining an open center and the same width and height above ground of the conveyor bed as those along the rest of system on which the bottoms of pans 34 pass between such flanges in the course of movement along the conveyor system 10. Table 12 is also provided with an inner set of parallel rails 107 in which a reciprocating pusher 108 operates, rails 107 having inwardly facing tracks 109 for wheels 110. An electric variable selected speed motor 111 through a speed reducer drives a belt 112a connected by a sprocket to a shaft 113 which through a magnetic clutch 114 rotates a longitudinally positioned pusher screw 115, mounted in stand 104 below rails 107, for forward movement of pusher 108. Pusher 108 is shown in foremost position in solid lines in FIGURES 2 and 3 and in rearmost position against a stop 112 in chain lines in FIGURE 3. Pusher 108 is provided with a depending plate 116 having a recess 117 therein which fits over a peripheral flange 118 integral with nut 119 for movement therewith. Nut 119 is internally threaded for engagement by the threads of ball screw 115, which can rotate but cannot move axially. The return of pusher 108 to its extreme left-hand starting position shown in dotted outline in FIGURE 3 is accomplished by a return motor 120 which through appropriate sprocket and chain connections 121 and 122 returns the pusher for a new pusher movement in the course of an operation. A third continuously running electric motor 123 is connected through a reducer 124 and sprockets 125 on a cross shaft to sprockets 126 and stub shafts 127 outboard of each side rail 103. From shafts 127 the remaining driven rollers 105 are driven by chains 128 in synchronism therewith. A magnetic clutch 129 is provided to coordinate the driving of rollers 105 on pusher table 12 to insure movement of a pallet pan 34 being transferred from transfer table 21 of transfer 18 to a position on pusher table 12 in front of pusher 108.

Pusher 108 is a horizontal carriage having wheels 110 at the respective ends thereof and a depressable head 131 with a forward positioning edge including a transverse roller 132 in the center thereof. Head 131 has two rearwardly extending arms 133 which are arcuately slotted at 134 to allow a transverse pin 135 to pass therethrough and into the sides of the wheeled horizontal carriage portion of pusher 108. The rear of the arms 133 are pivoted about the rear axle of pusher 108 by means of a sleeve 136 free to rotate thereon. Coiled springs about that axle to each side of sleeve 136 have bent fingers which extend forwardly into notches 137 to bias the arms 133 and head 131 into an upward position projecting above the height of the conveyor bed at the level of the horizontal tangent to the top of the treads of the rollers on table 12. The rear portions of the arms 133 are below the level of such conveyor bed so that a pan 34 leaving the transfer table 21 will readily depress head 131 in the course of movement thereover until it is in a position just ahead of roller 132 toward kiln 11 at which time head 131 will snap back up and be in a pusher readiness position relative to that pan 34 for the next intermittent positioning action to move that pan against the one in advance of it and all the pans in the train on the processing reach one step farther toward the exit end of kiln 11 and exit table 14. In the course of such a pusher action, motor 111 will be actuated and move pan 34 from the dotted line position shown in FIGURE 3 to the solid line position shown in FIGURE 3 whence it will rest until transfer 18 brings the next pan 34 for the next positioner action and intermittent advance step along the processing reach of conveyor system 10. When pusher 108 advances a new pan 34 to advanced position thereon, that pan 34 abuts the pan just ahead and continued working stroke movement of pusher 108 pushes all of the pans 34 ahead of it up one step including pushing of the pan 34 on exit table 14 onto transfer table 21 of transfer 19 for carriage to the return reach table 15. Of such pans on the processing reach of system 10, the greater portion thereof in the illustrated embodiment are within the product space 51 of kiln 11 and form a continuous succession or train of abutting pans each of which has the refractory shapes 58 and the wares 47 thereon for the desired processing. The pan 34 in FIGURE 3 farthest to the right has passed in part onto the idler rollers 13 which act as a processing table of system 10 in kiln 11.

Kiln 11 is provided with front posts 138 to which pusher table 12 may be connected in longitudinal registry therewith by straps 139. The continuous train of pans moving through the product space 51 may have friction imparted to the beginning and end of that train by snubbers 140, one form of which is shown in FIGURE 10. Therein, a pan moving in the direction of the arrow rubs upon a frictional material 141 carried by a shoe 142, such frictional material being, for example, asbestos-containing brake lining. An eye 143 on shoe 142 may be pivotally connected to the head of an L-shaped stud 144. The other end of the shoe may be biased upwardly by a compression spring 145 to extend the requisite amount selected above the conveyor bed to provide the desired frictional drag. Since all of the conveyor rollers 13 within kiln 11 are flanged idler rollers as described above, the snubbers 140 insure end-to-end abutment along the line of pans passing therethrough. The ends of the product space 51 in kiln 11 are open and as each pan 34 exits from the delivery end of kiln 11, it passes onto exit table 14 which is provided with legs on which to stand, side rails 23 and idler rollers 39 in the manner of idler table 16 except that exit table 14 is provided also, as aforesaid, with a snubber 140 for the purpose indicated. Transfer 19 with its sector carrier 20 and transfer table 21 cooperates with the ends of exit table 14 and return table 15 in the same way that transfer 18 cooperates with the ends of feed table 17 and pusher table 12.

In an illustrative operation of conveyor system 10, let it be assumed that baked ware on pallets 34 exiting from kiln 11 and transferred to return table 15 by transfer 19 proceeded onto idler table 16 where it was offloaded by an attendant along the outer side thereof within the time permitted by the selected rate of operations. The offloaded pans, with their refractory shapes 58 ready for a fresh load of wares, are then onloaded with fresh ware on idler table 16 nearer to feed table 17, or even on feed table 17 if desired. As each freshly loaded pan 34 moves into foremost position on the delivery end of feed table 17, motor 42 will be turned on to power driving rollers 39 to move it onto empty transfer table 21 after table 21 of transfer 18 has latched to bar 63 on feed table 17 by latch 64. Lead pan 34 will roll onto transfer table 21 and depress arm 89 lifting latch 64 out of engagement with bar 63 and operating limit switch 102 which after a short time delay provision, causes latch 64 to disengage itself, shuts off motor 42, applies magnetic brake 88 and energizes motor 72 and couples magnetic clutch 74 to rotate wheels 71 of transfer table 21 of transfer 18 to move it from the chainline position shown at the top of FIGURE 5 to the full line position at the bottom thereof.

The approach of table 21 to the entry end of pusher table 12 mechanically causes bar 31 to strike incline 148 on latch 32 raising it sufficiently to enable it to drop over and latch against bar 31, remaining there so as long as arm 89 is depressed by any part of the pan 34 on that table 21. As transfer table 21 reaches pusher table 12, a limit switch 146 fixed to table 21 will also be operated by a finger 147 fixed to transfer table 21, deenergizing clutch 74 stopping sector carriage 20, releasing brake 88, actuating clutch 79 to drive rollers 86, and actuating motor clutch 129 to turn driving rollers 105 to push the pallet 34 from table 21 onto the entry end of pusher table 12, depressing pusher head 131 in the course of so doing. As pan 34 from table 21 depresses head 131 on retracted carriage 108 and moves to a position in advance thereof, the side of the moving pan 34 will strike the movable finger of a limit switch 149 to deenergize clutch 79 stopping rollers 86, braking them by brake 88 and actuating clutch 114 of motor 111 to propel the newly arrived pan 34 from the chain line position shown in FIGURE 3 to the full line position therein at the end of the continuous succession of pans 34 on the processing reach of system 10. Such pushing of pan 34 causes it to then engage a further limit switch 150 on table 12 to declutch clutch 129 and stop rollers 105; reverses the direction of motor 72 and actuates magnetic clutch 74, latch 32 having previously been lifted above bar 31 by the removal of pan 34 from arm 89, so that transfer table 21 is free and begins to move in a clockwise direction (FIGURE 5) back to its readiness position at the end of and in registry with feed table 17.

When pusher 108 reaches its extreme position toward kiln 11, it actuates a limit switch 153 to energize return motor 120 to rotate screw rod 115 in the opposite direction to move pusher 108 back to its starting position. In such return nut 119 actuates a cutoff limit switch 151 which shuts off the motor 120 in sufficient time so that the end of pusher 108 toward transfer 18 comes to rest gently against a rubber bumper block 152 in stop 112.

As transfer table 21 approaches feed table 17, latch 64 will automatically lift and latch against bar 63 on table 17. Moreover, a limit switch 154 fixed in relation to feed table 17 will be actuated by such registry of transfer table 21 and will release brake 88 without engaging clutch 79; will actuate motor 42 and turn driving rollers 33 on the feed table 17 to move pallet pans 34 on table 17 toward transfer 18 and present the most advanced one in position for movement onto its table 21. The moment the lead pan 34 from feed table 17 moves onto the adjoining transfer table 21, it will depress arm 89 and actuate limit switch 102 to provide the time delay and automatic transfer of that lead pan 34 with the fresh ware thereon from transfer table 17 to feed table 12.

Transfer 19 at the delivery end works in exactly the same way as transfer 18 except it has a table 21 to transfer baked wares on a pan 34 from exit table 14 to return table 15. The transfer table 21 of transfer 19 has its limit switch 102 thereon and functions in the same manner. Moreover, as transfer table 21 reaches exit table 14, it will engage a limit switch 154a which functions in the manner of limit switch 154, but in the selected time sequence for the transfer 19 end, to declutch clutch 74, and take off brake 88 without engaging clutch 79, to receive the lead pallet from exit table 14 when pusher 108 moves in that direction at the other end. Such reception by table 21 of transfer 19 of a pan 34 depresses its arm 89, actuates its limit switch 102 to apply brake 88 and cause carrier 20 to swing around in a clockwise direction to the solid line position shown in FIGURE 1 where its latch 32 then engages the corresponding bar to bar 31 on table 15. As table 21 of transfer 19 approaches return table 15, a further limit switch 146a is actuated to perform the functions performed by limit switch 146 at the other end, but in the normally different time sequence operative between the respective ends for a selected continuous cycle. Thus, the actuation of limit switch 146a by finger 147a affixed to Table 21 will stop movement of the wheels 71 by uncoupling clutch 74 of transfer 19 and will start the driving of rollers 86 by the engagement of clutch 79 on table 21 of transfer 19, the brake 88 being simultaneously released. Thereby, the pan of that table 21 is driven on that return table 15 on which driving rollers 25 are continuously turned by motor 28 to continue movement of each pan 34 toward the idler table 16. Lifting of the arm 89 on transfer 19 acts in the same way as it does on transfer 18 to unlatch and return transfer 19 to its registry position with exit table 14 in readiness for a further transfer.

The described operational sequence is, it will be noted but one of a variety which a conveyor system 10 of this invention may take. And, although the described apparatus operation is semiautomatic, it will be recognized that it may be performed manually in whole or in part and that portions of conveyor system 10 which operate automatically may be controlled additionally for jogging or adjustment implementation, as desired. Further, instead of arcuate movement transfers, it will be apparent that straight line cross transfer mechanism between the respective ends of the straight reaches may also be utilized. Still further, a conveyor system of this invention may be utilized by services other than service in connection with a tunnel kiln, furnace or other, but may be used in connection with a production line for various types of goods. Thus, conveyor systems of this invention provide relatively great flexibility, freedom of action and advantages.

Various changes may be made in the illustrated embodiments and portions thereof and other embodiments provided, without departure from the spirit of this invention or the scope of the appended claims.

We claim:

1. A roller conveyor system comprising, in combination, a processing reach and a return reach in side by side relationship at substantially the same height and having flanged rollers rotatably mounted on opposite sides to define a conveyor bed along said reaches for pallets and the like, means for driving longitudinally spaced rollers on each side in selected portions of one or more of said reaches, the remaining non-driving rollers being idler rollers rotatably mounted along the sides of said respective reaches, said flanges of said driving and idler rollers defining the sides of said conveyor bed and the tops of the treads of such rollers defining the plane of such conveyor bed, said processing reach having pusher, processing and exit tables, said return reach having return, idler and feed tables and arcuate transfer means extending between adjacent ends of said reaches adapted to alternately register therewith to transfer at least one pallet from one said end to an another said end adjacent thereto, said transfer means having a sector carrier and transfer table adapted to register alternately with said respective ends.

2. In a roller conveyor system, apparatus comprising, in combination, a processing reach comprising a pusher table, a processing table and an exit table, said pusher table having longitudinally spaced pairs of transversely opposed flanged rollers along the length thereof, certain of said pairs of rollers comprising driving rollers adjacent the entry end of said pusher table, the remainder of said pairs of rollers being idler rollers, said rollers being journaled in nearer side rails respectively adjacent thereto to provide a substantially longitudinally open center between said rollers and side rails, a reciprocable pusher carriage having a depressible head, means to reciprocate such carriage in accordance with the entry upon said pusher table of a pallet and the like to be pushed, said driving rollers adapted to move said pallet over said head to depress the same until said pallet has moved beyond said head, means for biasing said head in normally upwardly projecting position, means for moving said pusher carriage toward said processing and exit tables to cause a pushed pallet to abut the trailing end of a pallet train and move said train along said processing reach, means for returning said pusher carriage to initial position in readiness for a new pushing stroke, said processing table and said exit table having idler rollers only and snubber means therein respectively, said snubber means comprising an upwardly biased frictional surface to engage the respective undersides of said pallets in said pallet train.

3. In a roller conveyor system, apparatus comprising, in combination, a transfer including a transfer table and a processing reach including a pusher table, a processing table and an exit table, said transfer and pusher tables adapted to be moved into cooperating adjoining registry having longitudinally spaced pairs of transversely opposed flanged rollers along the length thereof, certain of said pairs of rollers comprising driving rollers, the remainder of said pairs of rollers being idler rollers, at least certain of said rollers being journaled in nearer side rails respectively adjacent thereto, a reciprocable pusher carriage having a depressable head, means to reciprocate such carriage in accordance with the entry upon said pusher table of a pallet and the like to be pushed, said driving rollers adapted to move said pallet over said head to depress the same until said pallet has moved beyond said head, means for moving said pusher carriage toward said processing and exit tables to cause a pushed pallet to abut the trailing end of a pallet train and move said train along said processing reach, and means for returning said transfer table and pusher carriage to initial positions in readiness for a new cycle of operation, said processing table and said exit table having idler rollers only.

4. In a roller conveyor system, apparatus comprising, in combination, a processing reach comprising a pusher table, said table having longitudinally spaced pairs of transversely opposed flanged rollers along the length thereof, certain of said pairs of rollers comprising driving rollers, the remainder of said pairs of rollers being idler rollers, said rollers being journaled in nearer side rails respectively adjacent thereto to provide a substantially longitudinally open center between said rollers and side rails, a reciprocable pusher carriage having a depressable head, means to reciprocate such carriage in accordance with the entry upon said pusher table of a pallet and the like to be pushed, said driving rollers adapted to move said pallet over said head to depress the same until said pallet has moved beyond said head, means for biasing said head in normally upwardly projecting position, means for moving said pusher carriage toward the exit end of said processing reach to cause a pushed pallet to abut the trailing end of a pallet train and move said train along said processing reach, means for returning said pusher carriage to initial position in readiness for a new pushing stroke, a transfer table movable to a position to discharge pallets onto said pusher table, and respective latch means on said transfer table responsive to the presence and absence of a pallet thereon respectively.

5. In a roller conveyor system, apparatus comprising, in combination, a plurality of reaches having longitudinally spaced transversely opposed sets of flanged rollers, certain of said rollers being driven rollers of the overrunning type, transfer means operative between respective adjacent ends of said reaches, said transfer means comprising an arcuate track between such adjacent ends, a sector carrier adapted to move about the center of said track from one of said ends to the adjacent end and vice versa, driving wheels for said sector carrier, reversible motor means for driving said sector carrier back and forth along said track, a transfer table mounted on said sector carrier for respective registry with each of the respective adjacent reach ends, latch means carried by said transfer means at opposite ends of said transfer table for positive engagement with said respective ends, one of said latch means being engageable by one of said reach ends when there is no pallet on said transfer table and the other of said latch means being engageable when there is such a pallet on such transfer table, said transfer table having alternate sets of longitudinally spaced transversely opposed flanged idler and driving rollers, a brake operative against said driving rollers when a pallet is being carried by said transfer table and sector carrier from one reach end to an adjacent reach end, and clutch means for driving said driving rollers on said transfer table when it has a pallet thereon to move said pallet from said transfer table after it has been latched to the adjacent entry reach end onto which said pallet is to be moved.

6. In a roller conveyor system, apparatus comprising, in combination, transfer means operative between respective adjacent ends of reaches, said transfer means comprising an arcuate track between such adjacent ends, a sector carrier adapted to move about the center of said track from one of said ends to the adjacent end and vice versa, driving wheels for said sector carrier, reversible motor means for driving said sector carrier back and forth along said track, a transfer table mounted on said sector carrier for respective registry with each of the respective adjacent reach ends, said transfer table having alternate sets of longitudinally spaced transversely opposed flanged idler and driving rollers, means to resist movement of a pallet being carried by said transfer table from one reach end to an adjacent reach end, and means for driving said driving rollers on said transfer table when it has a pallet thereon to move said pallet from said transfer table after it has come into registry with the adjacent entry reach end onto which said pallet is to be moved.

7. In a roller conveyor system apparatus comprising, in combination, a processing reach having pusher, processing and exit tables, a parallel side by side return reach having return, idler and feed tables, reciprocable arcuate transfers between the respective ends of said respective reaches for alternate registry with the cooperating ends at appropriate times, said transfers having transfer tables, said pusher, return, feed and transfer tables having longitudinally spaced alternated sets of flanged driving and idler rollers, said driving rollers of said return table being continuously driven, said pusher table further having a reciprocating pusher, said processing, exit and idler tables having flanged idler rollers only, the respective flanges and treads of the rollers on said tables defining a conveyor bed for pallets and the like, means for maintaining a continuous train of discrete pallets and the like along said processing reach, means for separating pallets and the like at least on said idler table on said return reach, and switch means in controlling relationship to said system for coordinating the operational sequence of said system for predetermined processing of wares carried on said pallets and the like along said conveyor bed.

8. In a roller conveyor system, apparatus comprising, in combination, a conveyor section having longitudinally extending transversely spaced parallel side walls, flanged rollers on each side adjacent the wall on that side with said flanges outwardly relative to the centerline of said section, support means extending between each wall and the rollers on its side for rotatably journaling said rollers, the rollers on each side having their flanges in longitudinal alignment and the rollers on both sides having the tops of their respective treads in a common conveying plane, said conveyor section having means to elevate said rollers to a convenient working height, said rollers on opposite sides being in transversely opposed pairs, means for driving selected longitudinally spaced pairs, the distance beetween said longitudinally spaced pairs being less than the length of a workpiece to be conveyed by said rollers, and selected pairs of said driving rollers having means for the overrunning thereof when in engagement with a workpiece moving at a higher rate of speed than the driving speed of said last-named rollers.

References Cited by the Examiner

UNITED STATES PATENTS

| | | | |
|---|---|---|---|
| 2,525,189 | 10/1950 | Thomas | 198—24 |
| 2,588,141 | 3/1952 | McFarland et al. | 198—127 X |
| 2,636,591 | 4/1953 | Galper | 198—85 X |
| 2,646,647 | 7/1953 | Bamford et al. | 198—127 X |
| 2,760,617 | 8/1956 | Bowen | 198—139 X |
| 2,826,314 | 3/1958 | Van Der Pyl | 198—85 X |
| 2,976,981 | 3/1961 | Peras | 198—127 |

FOREIGN PATENTS

| | | |
|---|---|---|
| 843,780 | 8/1960 | Great Britain. |

SAMUEL F. COLEMAN, *Primary Examiner.*